United States Patent [19]

Carr

[11] 4,420,521
[45] Dec. 13, 1983

[54] THERMAL GARMENT DESIGN

[76] Inventor: George S. Carr, 5307 Gallatin St., Hyattsville, Md. 20781

[21] Appl. No.: 361,755

[22] Filed: Mar. 25, 1982

[51] Int. Cl.³ .............................................. A41D 1/22
[52] U.S. Cl. ........................................ 428/74; 2/69.5; 2/272; 428/117; 428/131; 428/138; 428/178; 428/284; 428/913
[58] Field of Search .................. 428/72, 74, 117, 131, 428/138, 178, 284, 246, 298, 234, 300, 920, 913; 2/69.5, 272

[56] References Cited

U.S. PATENT DOCUMENTS

| | | | |
|---|---|---|---|
| 3,162,566 | 12/1964 | Katz | 428/74 |
| 3,577,305 | 5/1971 | Hines et al. | 428/72 |
| 3,750,202 | 8/1973 | Merikalleo | 2/69.5 |
| 3,857,125 | 12/1974 | Hunt | 2/69.5 |
| 4,136,222 | 1/1979 | Jonnes | 2/272 |
| 4,343,669 | 8/1982 | Prior | 428/74 |

OTHER PUBLICATIONS

"Technology" B. J. Feder, New York Times, Jan. 21, 1982

Primary Examiner—James J. Bell

[57] ABSTRACT

Two sheets of reflective plastic film included in the construction of a fiber-insulated thermal garment mitigate radiated heat loss while retaining the conventional insulating properties of fibers. A layer of porous matted fibers separates the two layers of reflective sheets, holding them apart and allowing a free passage of air between. The plastic sheets are provided with venting holes which allow the garment to "breathe" and prevent moisture accumulation. The venting holes in opposing plastic sheets do not align but rather are offset, forcing warm air passing through the garment to follow a zigzag route. The plastic sheets are further provided with a flat black finish on their outer-facing surfaces in order that the inside sheet may recapture radiated heat from escaping warm air and the outside sheet may absorb any ambient radiated heat, such as sunlight. Two layers of breathable fabric give the insulation assemblage structural strength, the inside fabric layer being a lightweight material and the outside layer heavier and wind resistant.

4 Claims, 6 Drawing Figures

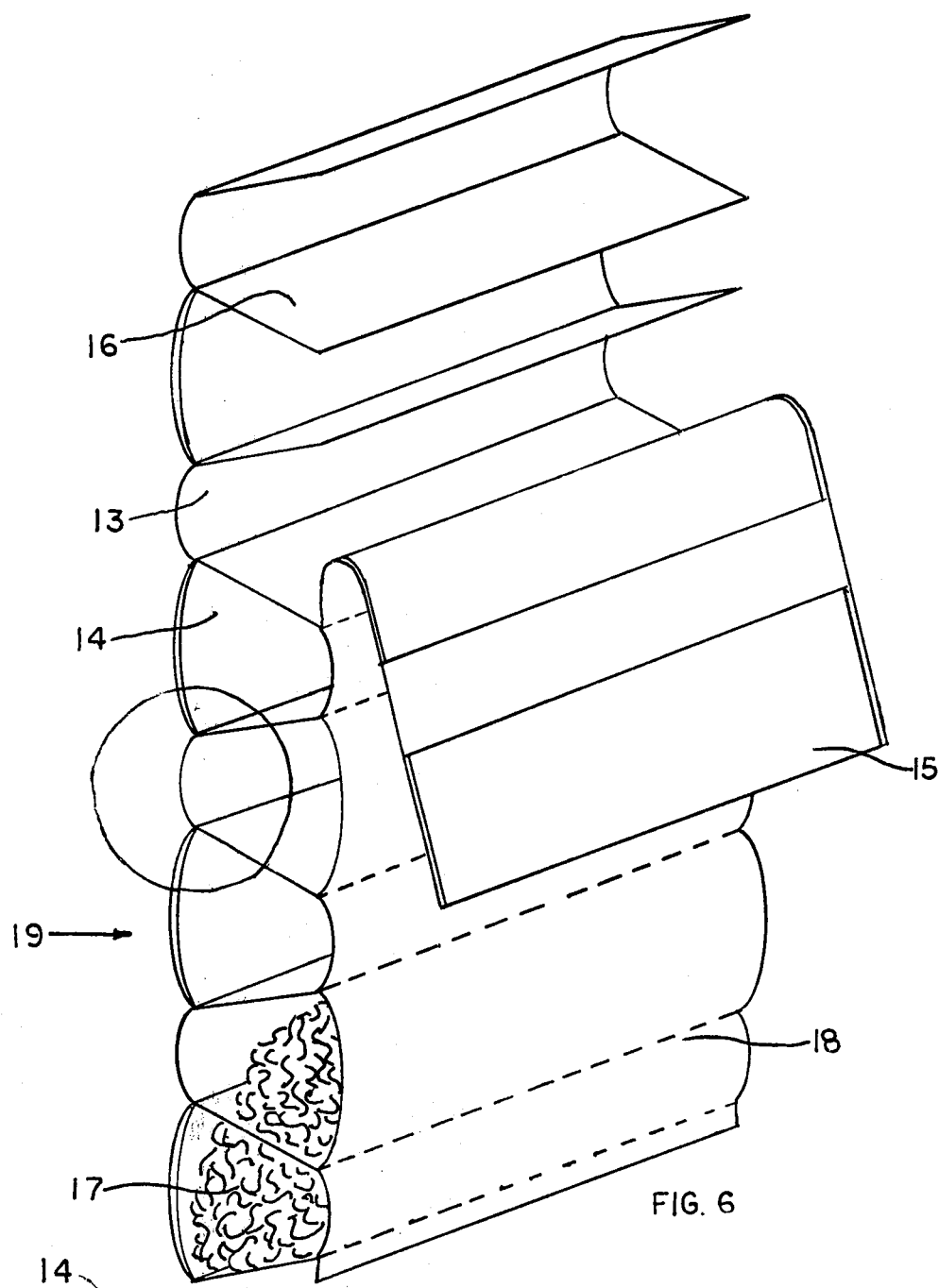
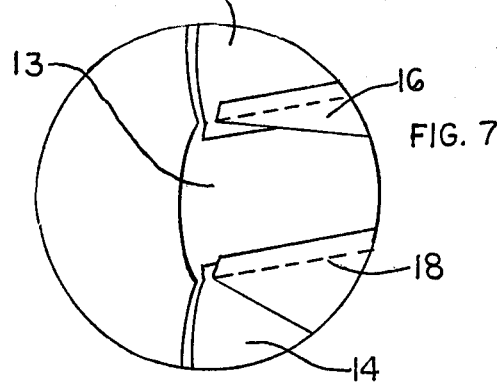
FIG. 6
FIG. 7

THERMAL GARMENT DESIGN

PRIOR ART STATEMENT

This invention relates to fiber- or down-insulated garments, and wearable thermal gear that utilizes reflective heat insulation.

The most efficient thermal garments available at present, in terms of their insulating abilty versus their weight, are those insulated with manmade fibers or down. These garments block convected heat loss by trapping many small "dead air" spaces among very fine fibers. This means of insulating is very effective, but garments of this type which are designed for use in the extreme cold are quite bulky, since the need for a better insulating ability is answered by a deeper fiber layer. One way to reduce bulk is to develop fibers that trap smaller dead air spaces, so that the thickness of the insulating layer may be reduced with no loss of efficiency. Other researchers are developing such new fibers, and these will no doubt play a big part in the design of thermal garments in the future.

The effectiveness of a reflective surface in combination with fibers as an insulator against heat loss is well known. Foil-backed fiberglass house insulation is a common application of the principle. However, in attempting to apply this principle to garment construction one is confronted with two major problems. The first problem is that most reflective materials are too inflexible or weak to be of use. Metal foils, for instance, tear easily, tend to want to stay in any shape they are conformed to rather than adopt a new conformation, and are heavy. Recently developed plastic films, however, such as Mylar (TM), meet these particular demands. They are very thin, lightweight and flexible, and strong enough so that, if they are stitched to a piece of fabric with a little fullness worked in between the outside seams, they will not tear along the needle perforations.

The second difficulty with reflective materials as elements of a garment design is that they are all, including the new plastic films, completely non-porous. An airtight garment traps perspiration, causing the wearer discomfort and lessening the insulating ability of clothes worn underneath when they become wet, thereby defeating the purpose of the reflective material. My invention solves this problem by providing the plastic sheets with venting holes which are of sufficient size relative to their distance apart to adequately exhaust body moisture.

The following patents disclose designs using reflective materials in thermal garments in order to achieve greater efficiency with less bulk than previous designs.

| U.S. Pat. No. | Patentee | Issue Date |
|---|---|---|
| 3,750,202 | Merikallio | 8/07/73 |
| 4,136,222 | Jonnes | 1/23/79 |

Merikallio discloses a lightweight, compact sleeping bag made of a watertight reflective fabric.

Jonnes discloses a thermally insulating sheet material with one or more reflective layers adhered to sheets of fabric and separated from each other by a honeycomb foam layer that has an array of openings, each of which encloses an air space ranging in size from 1.5 cubic centimeters to 24 cc.'s. Many minute fractures are created all over the surface of the reflective layer by stretching the supporting fabric, by which means the sheet material is able to breathe.

The abovementioned designs contain certain drawbacks not found in my invention. Merikallio's sleeping bag is designed to be water-tight, and therefore would trap body perspiration, eventually causing the user discomfort and reducing the sleeping bag's ability to insulate, although it could work well for short periods of use.

The effectiveness of Jonnes's design depends almost entirely on the heat reflective properties of his shiny surfaces. The pockets of air in the foam honeycomb enclosed between the two fabric sheets, 1.5 to 24 cc.'s in size, are thousands of times larger than the dead air spaces created by existing insulating fibers and are therefore much less efficient. Heat convection would transport thermal energy from the inside layer to the outside layer within each enclosed air pocket, even though the loss of radiated heat might be greatly reduced. The space taken up by these trapped air pockets would more wisely be used to contain fiber material. Further, the means by which the sheet material is made porous and breathable, with random minute fractures in the reflective surface, does not allow for the planned placement of venting holes.

The offset arrangement of venting holes in my invention means that any heat radiation passing through a venting hole in the inner plastic sheet is likely to encounter an unbroken area of reflective surface in the outer sheet and be reflected back to the wearer. At the same time, warm air passing through the garment to the outside is forced to travel a certain distance between the two plastic sheets, giving off a quantity of radiated heat that can be reflected back towards the wearer by the outer reflective sheet and absorbed by the inner flat black sheet. Another novel feature of the invention is the flat black outer surface of the outer plastic sheet that enables the garment to absorb any ambient radiated heat, especially from the sun. A further advantage of this design is that it can easily be realized using extant garment patterns by sewing on to each cut fabric piece a sheet of perforated and finished plastic film that is cut to the same size and shape as the pattern piece.

SUMMARY OF THE INVENTION

A thermal garment construction method according to one embodiment of the present invention comprises two sheets of reflectorized plastic film that are provided with a flat black finish on their outside surfaces, are separated by a fiber matting layer, and are enclosed inside and outside by two fabric layers.

One object of the present invention is to provide a thermal garment with improved insulating ability with little added weight or bulk.

Related objects and advantages of the present invention will be apparent from the following description.

BRIEF SUMMARY OF THE DRAWINGS

FIG. 6 is a perspective view of an embodiment of the invention when the conventional insulation means is to be loose fiber or down.

DESCRIPTION OF THE PREFERRED EMBODIMENT

Figure 1:
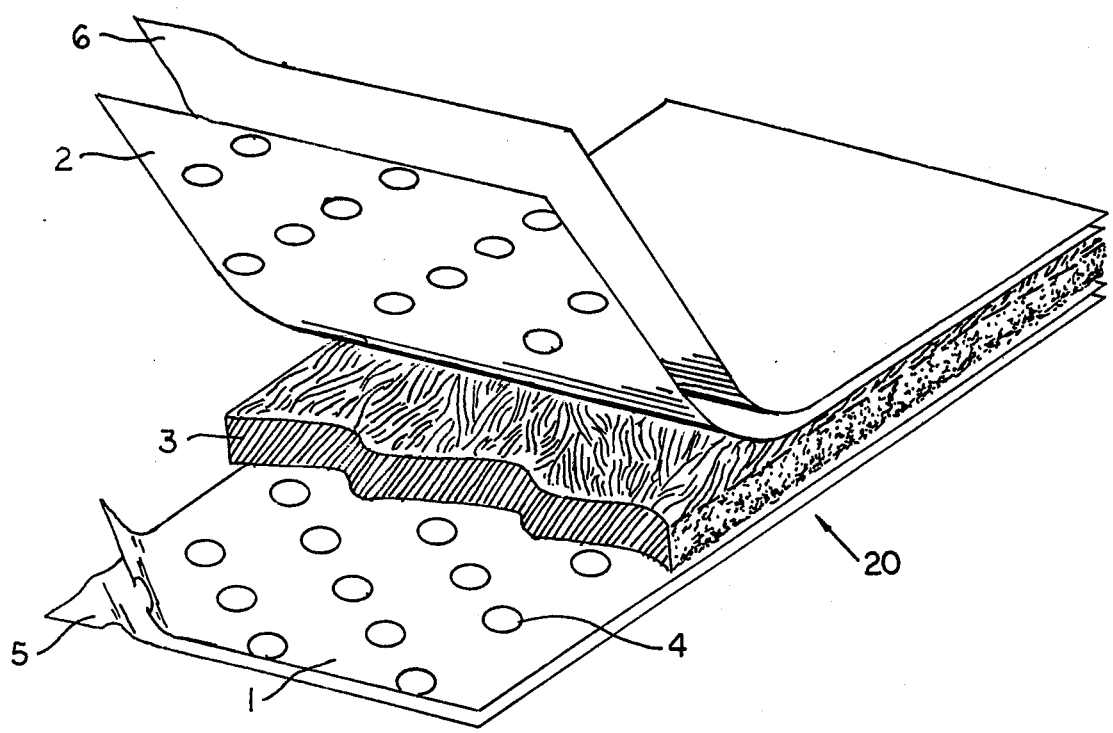
FIG. 1 is a perspective view of a fiber-insulated garment section with the additional insulation means of two reflective sheets, according to a typical embodiment of the present invention.

For the purposes of promoting an understanding of the principles of the invention, reference will now be made to the embodiments shown in the drawings and specific language will be used to describe the same. It will nevertheless be understood that no limitation of the scope of the invention is thereby intended, such alterations and further modifications in the illustrated invention, and such further applications of the principles of the invention as illustrated therein, being contemplated as would normally occur to one skilled in the art to which the invention relates.

Referring to FIG. 1, there is illustrated an assemblage of materials which is similar to that found in a thermal outergarment. Assemblage 20, includes an inner plastic sheet 1, and an outer plastic sheet 2, provided with venting holes 4, which are separated from each other by matted fiber layer 3, and covered on the inside by light breathable fabric layer 5, and on the outside by breathable windproof layer 6. The thickness of the fiber layer may vary according to the insulation value needed for the garment's intended use, but for ease of construction it is better that two (2) fiber layers be used to achieve the desired thickness, in order that the relatively fragile plastic sheets may first be sewn between the sturdier fiber and fabric pattern pieces and so be protected during the garment's construction.

Figure 2:
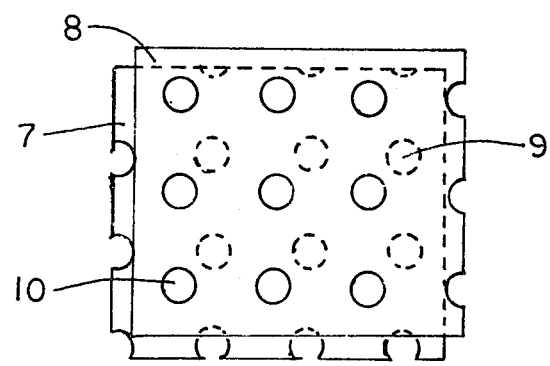
FIG. 2 is a partial top perspective view of the embodiment of FIG. 1 with fabric and fiber layers not shown, illustrating the relationship of the venting holes in opposing plastic sheets.

Referring to FIG. 2, there is an illustration of the plastic sheets of FIG. 1 seen from above with fiber and fabric layers not included, showing the offset placement of venting holes 9, in inner plastic sheet 7, in relation to venting holes 10, in outer plastic sheet 8. The size of the venting holes may vary, but their size relative to their distance apart should be such that the distance between their centers is approximately five times the length of their radii, in order that unbroken reflective areas in opposing plastic sheets may overlap. The preferred shape of the venting holes is round rather than square or any other geometric shape so that no corners exist where the plastic sheeting would be more likely to tear. The preferred method of forming the holes is by melting with a hot tool, which process leaves a bead of melted and resolidified plastic around the border of each hole and helps to prevent the plastic sheet from tearing.

Figure 3:
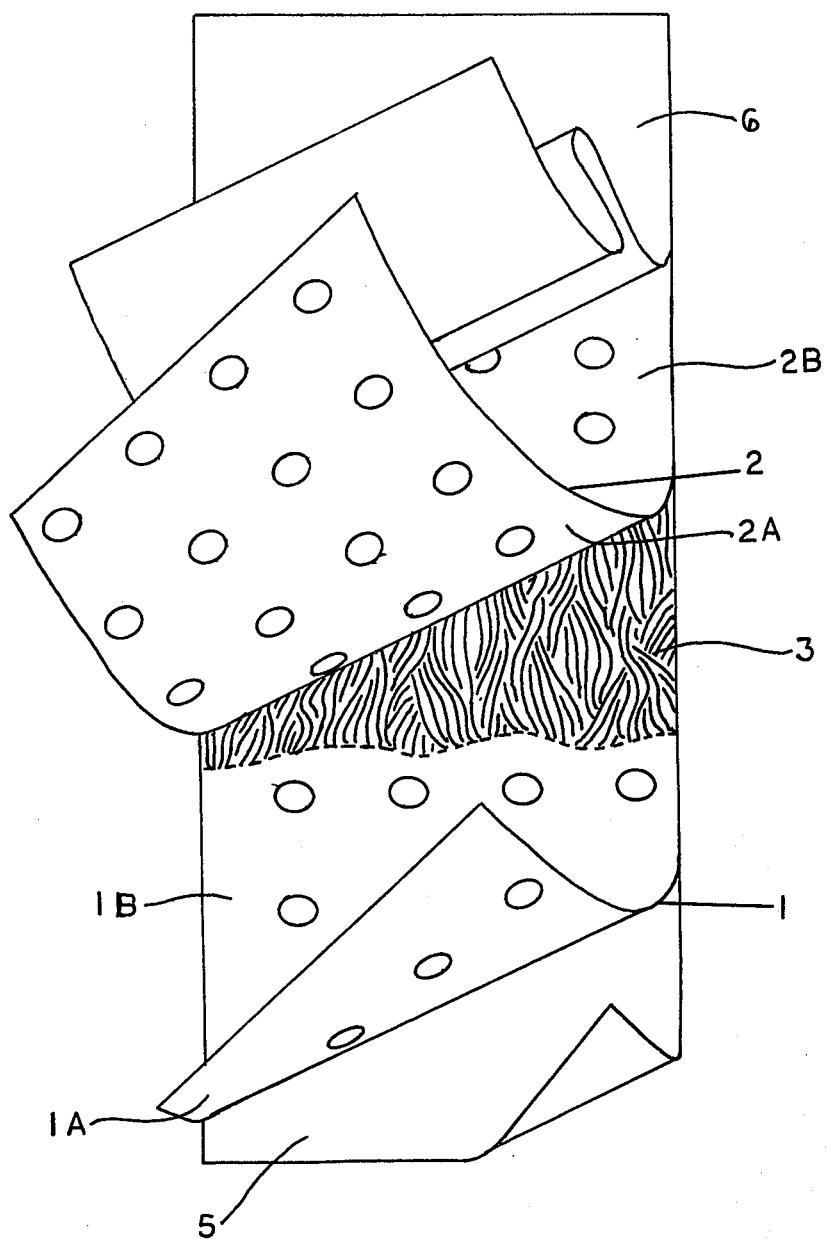
FIG. 3 is a top perspective view of the FIG. 1 assemblage, with the fiber layer half cut away, showing both sides of both plastic sheets.

Referring to FIG. 3, the assemblage of FIG. 1 is seen from above, showing reflective inside surface 1A, and flat black outside surface 1B, of inside plastic sheet 1. Shown also are reflective inside surface 2A, and flat black outside surface 2B, of outside plastic sheet 2.

Figure 4:
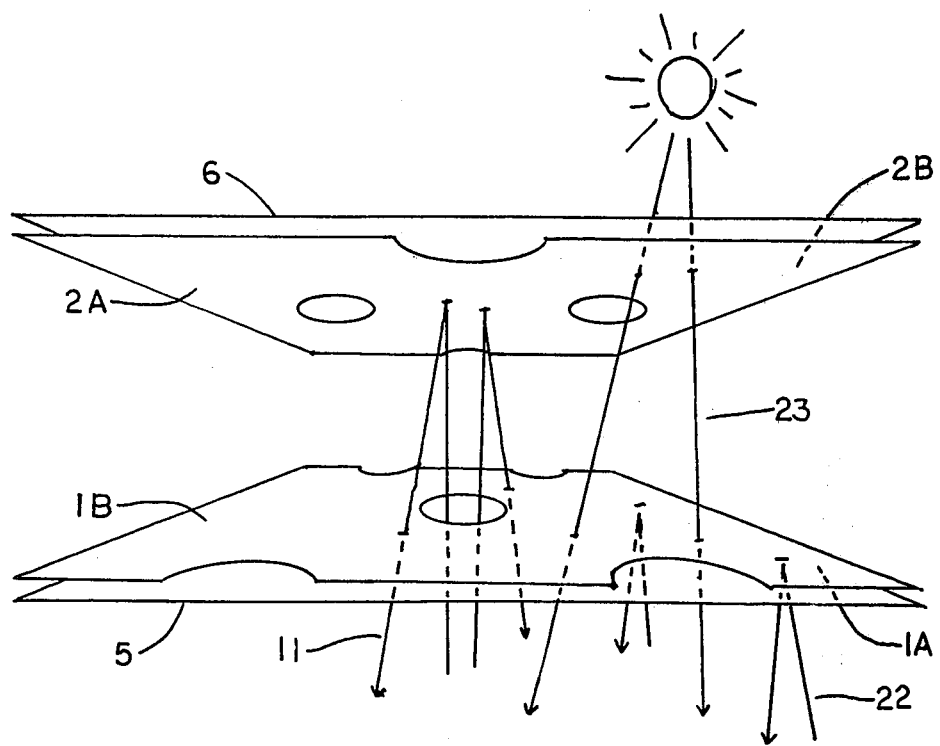
FIG. 4 is a partial side perspective view of the FIG. 1 assemblage, fiber layer not shown, depicting the manner by which the plastic sheets block heat radiating from the body and absorb it from the outside.

Referring to FIG. 4, the assemblage of FIG. 1 is seen in one-point perspective from the side with fiber layer not shown, with a simplified depiction of the manner by which the two plastic sheets tend to trap radiated heat, the heat pathways being represented in the drawing by solid and broken arrows. Radiated heat 22, from the wearer's body strikes shiny surface 1A, and is reflected back, whild radiated heat 11, which escapes via a venting hole in the inner plastic sheet strikes shiny surface 2A, is reflected back to and absorbed by black surface 1B, and radiates to the wearer.

Figure 5:
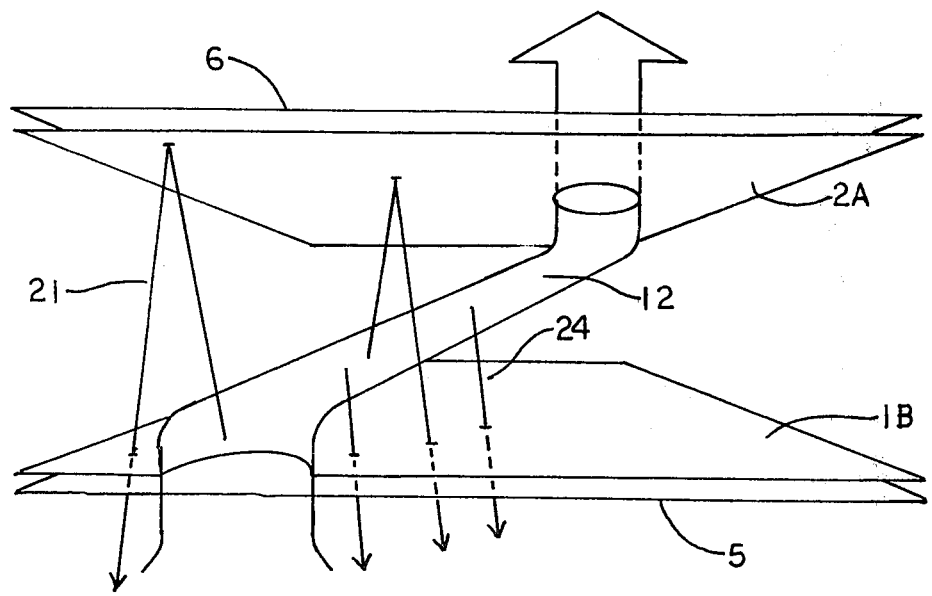
FIG. 5 is the view of FIG. 4 depicting the manner by which the plastic sheets salvage radiated heat from escaping warm air.

Referring to FIG. 5, the view of the assemblage of FIG. 4 is shown, with a simplified depiction of the manner by which the plastic sheets tend to salvage radiated from warm air being exhausted from the garment. Warm air 12, passes through a venting hole in the inner plastic sheet and exits via a venting hole in the outer plastic sheet, in the process giving off radiated heat 24, which is absorbed by black surface 1B, and radiates toward wearer. Radiated heat 21, is reflected by shiny surface 2A, absorbed by black surface 1B, and radiates toward wearer.

Referring to FIG. 6, there is illustrated a typical embodiment of the invention when the conventional insulating material is to be loose fiber or down. Breathable inner fabric layer 15, is joined to outer windproof layer 13, by highly porous panels 16, which keep loose fiber or down 17, from shifting downwards but allow air to pass through. Reflective plastic layers 14, are sewn inside the box constructions to both inner and outer layers, but on the wide surface of each box construction only, so that they overlap and air can pass through the narrow surfaces. Air is able to pass through the inner fabric layer via the narrower surfaces of the box constructions, pass through the fiber layer and the porous retaining panels, and exit via the outer, narrower surfaces of the box constructions. The reflective plastic sheets are provided with a flat black finish on their outside surfaces. This embodiment of the invention functions similarly to the embodiment of FIG. 1.

What is claimed is:

1. In combination:
    a thermal garment insulation means of a fiber layer sandwiched between two layers of fabric;
    said fiber and fabric layers with two reflective plastic film layers intervening;
    said plastic film layers having venting holes offset from one another in opposing layers.

2. The combination of claim 1 wherein the reflective layers are provided with a flat black finish on their outer surfaces.

3. In combination:
    a thermal garment insulation means of horizontal fabric box constructions containing loose fibers or down;
    said box constructions having alternately narrow and wide surfaces on interior and exterior portions;
    said wide surfaces of box constructions having reflective plastic film layers sewn inside each box construction.

4. The combination of claim 3 wherein the plastic film layers are provided with a flat black finish on their outer surfaces.

* * * * *